MAGNETIC MEMORY ELEMENTS WITH STACKED MAGNETIC LAYERS

Filed April 14, 1966

INVENTORS
Ernst Feldtkeller
Karl-Ulrich Stein
BY [signature]
ATTYS.

United States Patent Office 3,518,639

Patented June 30, 1970

3,518,639

MAGNETIC MEMORY ELEMENTS WITH STACKED MAGNETIC LAYERS

Ernst Feldtkeller and Karl-Ulrich Stein, Munich, Germany, assignors to Siemens Aktiengesellschaft, a corporation of Germany Filed Apr. 14, 1966, Ser. No. 542,701

Claims priority, application Germany, Apr. 15, 1965, S 96,580

Int. Cl. G11c *11/14*

U.S. Cl. 340—174 3 Claims

ABSTRACT OF THE DISCLOSURE

A magnetic memory matrix employs individual memory elements which comprise a plurality of superimposed multilayer magnetic elements, the layers of which are separated from one another of magnetically conducting, non-magnetic interlayers, these multilayer combinations being insulated from one another and from control conductors by insulating layers. The order of stacking the various components is such that in different embodiments the magnetic layers are remote from one another or near one another to determine the completeness of formation of magnetic ring closures, the more complete the ring closure, the greater the reduction of the demagnetizing field.

The present invention relates to the construction of a memory matrix whose individual memory elements comprise superimposed magnetic layers separated from one another, in each case, by non-magnetic interlayers, preferably of the same material.

According to application Ser. No. 440,646, filed March 17, 1965 and now U.S. Pat. No. 3,375,091 of the same assignee it was there proposed that the stacked magnetic layers be separated from one another by electrically conducting non-magnetic or possibly only weakly magnetic interlayers, whereby Bloch line displacements and thereby the "creeping" of the walls leading to decomposition of information are largely prevented. Beyond this, it is herein proposed to place the lower magnetic field strength limit for the coherent and complete rotation of the magnetization and the upper field strength limit for the reversible magnetization rotation (no information breakdown) so close together that, in distinction to simple magnetic layers, a coincidentally controllable information storer could be realized or that the production tolerances for a linearly controlled information storer could be more easily maintained.

It has been concluded that the limits of the aforementioned field strengths lie sufficiently close together only when a large ratio exists of the layer surface or of the layer diameter or of the edge length of the individual memory element to the layer thickness. The use of memory elements with large layer surface and thereby a large ratio of layer surface to layer thickness results, aside from the only slight unit density achievable, i.e., number of memory element per matrix, in further disadvantages such as the necessity of large conrtol currents and long control lines. The long control lines, in turn, lead to delays and deformation of the normally pulse-like control signals. By reason of these disadvantages efforts are made to create memory elements of small geometric dimensions, in particular, smaller than 1 mm.$^2$.

The layer thickness should not, on the other hand, be made too small, because that would have as a consequence a reduction of the output signal.

The present invention has as its underlying problem to reconcile with one another the above mentioned partially opposite requirements.

For the solution of these problems the invention provides, in memory elements of the type initially mentioned, which are preferably grouped into a matrix and arranged in rows as well as columns, that in each case at least two series of multiple magnetic layers, each comprising stacked magnetic layers, which are separated from one another by electrically conducting, non-magnetic or possibly only weakly magnetic interlayers, in which system the one multiple layer is arranged on the surface of one side and the other multiple layer on the surface of the other side, and thus opposed to the surface of the first mentioned side, of at least one control or reading line.

There is thus produced between such multiple layers, at least temporarily, a very nearly completely closed magnetic ring closure which leads to a reduction of the demagnetizing field.

Expediently the memory elements and control or writing and reading lines are in each case electrically insulated from one another, for example, by means of insulating sheets or an insulating layer preferably having a flattening or smoothing effect for example, a silicon monoxide or a silicon dioxide layer.

In the drawings, wherein like reference characters indicate like or corresponding parts:

Figure 1:
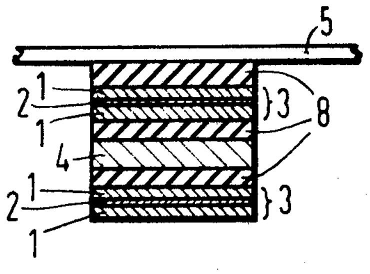
FIG. 1 is a transverse sectional view through two series of multiple layers grouped into a memory element with respective control lines.

In the drawings there are illustrated various combinations of two series of multiple layers, grouped into a memory element and arranged on both sides of at least one control line, in which reference numerals 5, 6 or 7 designate a writing and reading line, with reference numeral 4 designating the writing line arranged orthogonally thereto and illustrated in cross section. The multiple magnetic layers 3 and the writing as well as reading lines 4 and 5 and 6, 7, respectively, are at least partially electrically insulated with respect to each other by means of insulating layers 8, for example, silicon monoxide or silicon dioxide layers.

In the examples of construction according to FIGS. 1 and 2, the multiple magnetic layers 3 are arranged on both sides of the control lines serving as writing lines 4, designated in the following as X-lines. The multiple layers of a series consist of ferromagnetic layers 1, which are separated from one another by electrically conducting non-magnetic layers 2. In each case over one of the two multiple layers 3, and on the end facing away from the X-line 4 of this multiple layer, there is conducted the line 5, which may be sub-divided into a Y-writing line 6 and Y-reading line 7.

Figure 2:
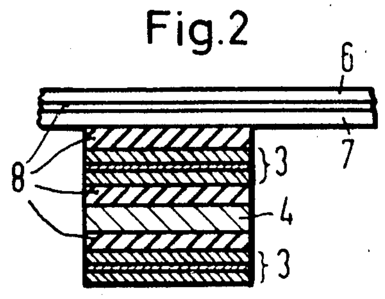
FIG. 2 is a view similar to FIG. 1, in which the line 5 is subdivided into two lines.
Figure 3:
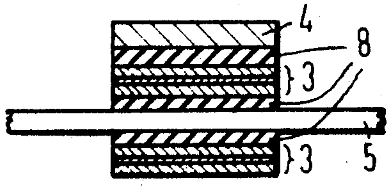
FIG. 3 is a view similar to FIG. 1, with writing and reading lines being reversed.

The arrangement according to FIG. 3 differs from the example of construction according to FIG. 1 merely in the interchanging of lines 4 and 5.

Figure 4:
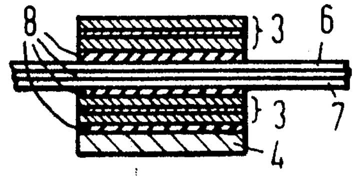
FIG. 4 is a view similar to FIG. 3, with the line 5 being sub-divided into two lines.

The same is also true for the example of construction according to FIG. 4, in which, however, the Y-line 5 according to FIG. 1 or 3 is sub-divided into writing and reading lines 6 and 7, respectively.

Figure 5:
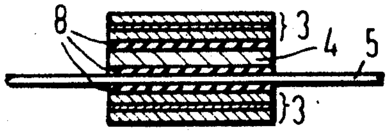
FIG. 5 is a view similar to FIG. 1, with all the writing and reading lines being disposed between the series of multiple layers.
Figure 6:
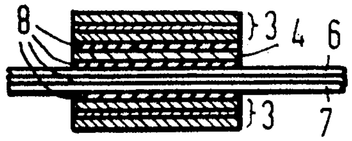
FIG. 6 is a view similar to FIG. 5 but utilizing subdivided lines.

In the examples of construction according to FIGS. 5 and 6, all the writing and reading lines 4 and 5 or 6, 7 are arranged between multiple magnetic layers 3.

While the example of construction illustrated in FIGS. 5 and 6 does have the disadvantage that the two multiple magnetic layers are relatively far remote from one another, it has the advantage that the two multiple layers constantly remain magnetized anti-parallel to one another, so that the magnetic ring closure is permanently maintained.

As an alternative to the mounting of all layers and lines on one carrier there also exists the possibility of pressing two carriers against one another each with a part of the layers and lines.

If the thin electrically insulating layers are replaced by thin plastic sheets, the latter can simultaneously serve as carriers for a part of the lines.

We claim:

1. A magnetic memory element comprising:
a plurality of multiple magnetic layer means each including at least two planar magnetic layers and a separate substantially non-magnetic layer between each two magnetic layers;
a plurality of electrically conductive planar control line means orthogonally disposed to each other; and
a plurality of planar electrically insulating layers, said multiple magnetic layer means, said control lines and said insulating layers being superimposed in stacked relation with no like two of the just-named elements being adjacently disposed, and stacked in the order of a first control line means, a first insulating layer, a first multiple magnetic layer means, a second insulating layer, a second control line means, a third insulating layer, and a second multiple layer means.

2. A magnetic memory element comprising:
a plurality of multiple magnetic layer means each including at least two planar magnetic layers and a separate substantially non-magnetic layer between each two magnetic layers;

a plurality of electrically conductive planar control line means orthogonal disposed to each other; and
a plurality of planar electrically insulating layers, said multiple magnetic layer means, said control lines and said insulating layers being superimposed in stacked relation with no like two the just-named elements being adjacently disposed, and the named elements stacked in the order of a first multiple layer means, a first insulating layer, a first control line means, a second insulating layer, a second control line means, a third insulating layer, and a second multiple magnetic layer means.

3. A magnetic memory element comprising:
a plurality of multiple magnetic layer means each including at least two planar magnetic layers and a separate substantially non-magnetic layer between each two magnetic layers;
a plurality of electrically conductive planar control line means orthogonally disposed to each other; and
a plurality of planar electrically insulating layers, said multiple magnetic layer means, said control lines and said insulating layers being superimposed in stacked relation with no like two of the just-named elements being adjacently disposed, and the named elements stacked in the order of a first multiple magnetic layer means, a first insulating layer, a first control line means, a second insulating layer, a second multiple magnetic layer means, a third insulating layer, and a second control line means.

References Cited

UNITED STATES PATENTS

| | | | |
|---|---|---|---|
| 3,305,814 | 2/1967 | Moyer | 336—200 |
| 3,210,707 | 10/1965 | Constantakes | 336—200 |
| 3,375,091 | 3/1968 | Feldtkeller. | |
| 3,358,273 | 12/1967 | Henninger et al. | 340—174 |

JAMES W. MOFFITT, Primary Examiner